United States Patent
Kim et al.

(10) Patent No.: US 10,608,289 B2
(45) Date of Patent: Mar. 31, 2020

(54) METHOD OF MANUFACTURING SECONDARY BATTERY ELECTRODE CONTAINING PTC MATERIAL AND ELECTRODE MANUFACTURED THEREBY

(71) Applicant: LG Chem, Ltd., Seoul (KR)

(72) Inventors: Kyoung Ho Kim, Daejeon (KR); Je Young Kim, Daejeon (KR); Hoe Jin Hah, Daejeon (KR); Chae Ah Kim, Daejeon (KR)

(73) Assignee: LG Chem, Ltd. (KR)

( * ) Notice: Subject to any disclaimer, the term of this patent is extended or adjusted under 35 U.S.C. 154(b) by 102 days.

(21) Appl. No.: 15/510,070

(22) PCT Filed: Nov. 19, 2015

(86) PCT No.: PCT/KR2015/012461
§ 371 (c)(1),
(2) Date: Mar. 9, 2017

(87) PCT Pub. No.: WO2016/099038
PCT Pub. Date: Jun. 23, 2016

(65) Prior Publication Data
US 2017/0309970 A1    Oct. 26, 2017

(30) Foreign Application Priority Data
Dec. 16, 2014    (KR) .................. 10-2014-0181568

(51) Int. Cl.
*H01M 4/13*    (2010.01)
*H01M 10/42*    (2006.01)
(Continued)

(52) U.S. Cl.
CPC .......... *H01M 10/4235* (2013.01); *H01C 7/02* (2013.01); *H01C 7/027* (2013.01);
(Continued)

(58) Field of Classification Search
None
See application file for complete search history.

(56) References Cited

U.S. PATENT DOCUMENTS 5,451,919 A    9/1995    Chu et al.
6,623,883 B1    9/2003    Kise et al.
(Continued)

FOREIGN PATENT DOCUMENTS

JP    H08512174 A    12/1996
JP    H09306706 A    11/1997
(Continued)

OTHER PUBLICATIONS

Translation of KR10-2008-0088467 to Kasamatsu et al. (Year: 2008).*
(Continued)

*Primary Examiner* — Lucas J. O'Donnell
(74) *Attorney, Agent, or Firm* — Lerner, David, Littenberg, Krumholz & Mentlik, LLP

(57) ABSTRACT

Disclosed herein is a method of manufacturing a secondary battery electrode containing a positive temperature coefficient (PTC) material, the method including (a) applying first slurry including a first mixture and a solvent mixed with each other to one surface of a planar current collector to generate a PTC material after drying, (b) applying second slurry including a second mixture, including an electrode active material, and a solvent mixed with each other to the first slurry applied to the current collector, which is in a non-dried state, and (c) drying the first slurry and the second slurry applied to the current collector.

20 Claims, 1 Drawing Sheet

(51) Int. Cl.
*H01M 4/62* (2006.01)
*H01M 4/139* (2010.01)
*H01C 17/065* (2006.01)
*H01C 7/02* (2006.01)
*H01M 4/04* (2006.01)
*H01M 10/052* (2010.01)
*H01G 11/28* (2013.01)

(52) U.S. Cl.
CPC .... *H01C 17/06586* (2013.01); *H01M 4/0404* (2013.01); *H01M 4/13* (2013.01); *H01M 4/139* (2013.01); *H01M 4/62* (2013.01); *H01G 11/28* (2013.01); *H01M 10/052* (2013.01); *H01M 2200/106* (2013.01)

(56) References Cited

U.S. PATENT DOCUMENTS

| | | | |
|---|---|---|---|
| 2005/0079422 | A1 | 4/2005 | Ko et al. |
| 2007/0026312 | A1 | 2/2007 | Imachi et al. |
| 2008/0241684 | A1 | 10/2008 | Muraoka et al. |
| 2013/0130075 | A1 | 5/2013 | Kim et al. |
| 2015/0221449 | A1 | 8/2015 | Saito et al. |
| 2015/0303484 | A1 | 10/2015 | Iida et al. |

FOREIGN PATENT DOCUMENTS

| | | | |
|---|---|---|---|
| JP | H11185733 | A | 7/1999 |
| JP | H11314062 | A | 11/1999 |
| JP | 2000158814 | A | 6/2000 |
| JP | 2001357854 | A | 12/2001 |
| JP | 2004090294 | A | 3/2004 |
| JP | 2007035589 | A | 2/2007 |
| JP | 2008198596 | A | 8/2008 |
| JP | 2008243708 | A | 10/2008 |
| JP | 2009158450 | A | 7/2009 |
| JP | 2009176599 | A | 8/2009 |
| JP | 2011210478 | A | 10/2011 |
| JP | 2013254692 | A | 12/2013 |
| JP | 2014505335 | A | 2/2014 |
| JP | 2015195183 | A | 11/2015 |
| KR | 200182058 | Y1 | 5/2000 |
| KR | 200182059 | Y1 | 5/2000 |
| KR | 200182060 | Y1 | 5/2000 |
| KR | 20050035074 | A | 4/2005 |
| KR | 20050090748 | A | 9/2005 |
| KR | 20080088467 | A | 10/2008 |
| KR | 20130004153 | A | 1/2013 |
| WO | 1999067835 | A1 | 12/1999 |
| WO | 2014046112 | A1 | 3/2014 |
| WO | 2014077384 | A1 | 5/2014 |

OTHER PUBLICATIONS

International Search Report from PCT/KR2015/012461, dated Feb. 29, 2016.

* cited by examiner

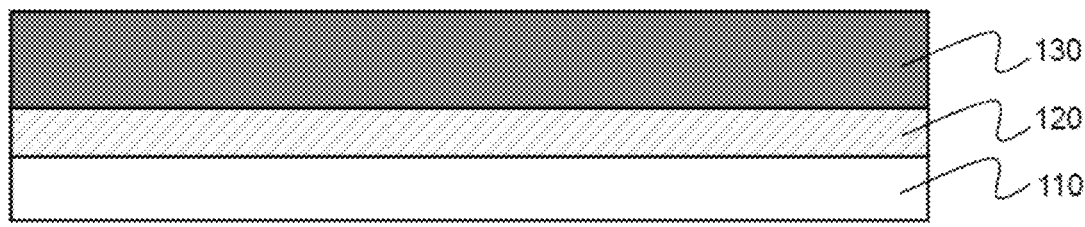

METHOD OF MANUFACTURING SECONDARY BATTERY ELECTRODE CONTAINING PTC MATERIAL AND ELECTRODE MANUFACTURED THEREBY

CROSS-REFERENCE TO RELATED APPLICATIONS

This application is a national phase entry under 35 U.S.C. § 371 of International Application No. PCT/KR2015/012461 filed Nov. 19, 2015, which claims priority from Korean Patent Application No. 10-2014-0181568 filed on Dec. 16, 2014, both of which are incorporated herein by reference.

TECHNICAL FIELD

The present invention relates to a method of manufacturing a secondary battery electrode containing a positive temperature coefficient (PTC) material and an electrode manufactured thereby.

BACKGROUND ART

The rapid increase in the use of fossil fuels has accelerated the demand for alternative energy sources or clean energy sources, and research has been actively carried out into power generation and power storage using electrochemistry.

A typical example of an electrochemical device using such electrochemical energy is a secondary battery, which has been increasingly used in various fields.

Based on the shape of a battery case, secondary batteries are classified into a cylindrical battery having an electrode assembly mounted in a cylindrical metal container, a prismatic battery having an electrode assembly mounted in a prismatic metal container, and a pouch-shaped battery having an electrode assembly mounted in a pouch-shaped case made of an aluminum laminate sheet.

Based on the structure thereof, an electrode assembly, configured to have a positive electrode/separator/negative electrode structure, which constitutes a secondary battery, is classified as a jelly-roll (wound) type electrode assembly or a stacked type electrode assembly. The jelly-roll type electrode assembly is manufactured by coating a metal foil, which is used as a current collector, with an electrode active material, drying and pressing the metal foil, cutting the metal foil into the form of a band having a predetermined width and length to form a positive electrode and a negative electrode, stacking the positive electrode and the negative electrode in the state in which a separator is disposed between the positive electrode and the negative electrode, and winding the positive electrode, the separator, and the negative electrode, which are stacked, in a spiral fashion. The jelly-roll type electrode assembly is suitable for a cylindrical battery. However, it is difficult to apply the jelly-roll type electrode assembly to a prismatic battery or a pouch-shaped battery due to problems, such as separation of the electrode active material and low space utilization. On the other hand, the stacked type electrode assembly, which is configured to have a structure in which a plurality of unit positive electrodes and a plurality of unit negative electrodes are sequentially stacked, has an advantage in that it is easy to configure the stacked type electrode assembly in a prism shape.

In addition, there has been developed a stacked/folded type electrode assembly having an improved structure, which is a combination of the jelly-roll type electrode assembly and the stacked type electrode assembly. The stacked/folded type electrode assembly is configured to have a structure in which a plurality of full cells, each of which basically has a positive electrode/separator/negative electrode structure and has a predetermined unit size, are arranged, or a plurality of bi-cells, each of which basically has a positive electrode (or negative electrode)/separator/negative electrode (or positive electrode)/separator/positive electrode (or negative electrode) structure and has a predetermined unit size, are arranged, is folded using a long continuous separation film. The details of the stacked/folded type electrode assembly are disclosed in Korean Patent Application Publication No. 2001-82058, No. 2001-82059, and No. 2001-82060, which have been filed in the name of the applicant of the present patent application.

Meanwhile, in the case in which a sharp needle-shaped conductor having high electrical conductivity, such as a nail, penetrates into the electrode assembly, the positive electrode and the negative electrode of the electrode assembly are electrically connected to each other by the needle-shaped conductor, with the result that current flows through the needle-shaped conductor, the resistance of which is low. At this time, the electrodes through which the needle-shaped conductor has penetrated are deformed, and high resistance heat is generated due to conducting current in a contact resistance portion between a positive electrode active material and a negative electrode active material. In the case in which the temperature in the electrode assembly exceeds a critical temperature level due to the resistance heat, the positive electrode and the negative electrode contact each other due to shrinkage of the separator, with the result that a short circuit occurs. Such a short circuit causes a thermal runaway phenomenon. As a result, the electrode assembly and a secondary battery including the electrode assembly may catch fire or explode.

In addition, in the case in which the electrode active material or the current collector bent by the needle-shaped conductor contacts opposite electrode facing the electrode active material or the current collector, heat higher than the resistance heat is generated, whereby the thermal runaway phenomenon may be further accelerated. These problems may be more serious in a bi-cell including a plurality of electrodes and an electrode assembly including the same.

In order to solve the above problems, attempts to contain a positive temperature coefficient (PTC) material, which exhibits uniform conductivity at the general operating temperature of a battery and the resistance of which is abruptly increased to interrupt the flow of current when the temperature in the battery is increased, in the electrode have been made. In the case in which an additional layer made of the PTC material is formed on the electrode, the process of manufacturing the battery is complicated, with the result that the cost of manufacturing the battery is excessively increased. In addition, the binding force between the PTC material layer and the electrode active material layer is low, with the result that the PTC material layer and the electrode active material layer may be separated from each other.

Therefore, there is a high necessity for technology that is capable of reasonably reducing the cost of manufacturing the electrode containing the PTC material and securing the binding force between the PTC material layer and the electrode active material layer.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have found that, in the case in which a step of applying second slurry to first slurry, which is in a non-dried state and has been applied to a current collector, is included, as will be described hereinafter, it is possible to achieve unexpected excellent effects. The present invention has been completed based on these findings.

Technical Solution

In accordance with one aspect of the present invention, the above and other objects can be accomplished by the provision of a method of manufacturing a secondary battery electrode containing a positive temperature coefficient (PTC) material, the method including (a) applying first slurry including a first mixture and a solvent mixed with each other to one surface of a planar current collector to generate a PTC material after drying, (b) applying second slurry including a second mixture, including an electrode active material, and a solvent mixed with each other to the first slurry applied to the current collector, which is in a non-dried state, and (c) drying the first slurry and the second slurry applied to the current collector.

The first mixture may include a polymer material, conductive particles, and a first binder, and the second mixture may include an electrode active material, a conducting agent, and a second binder.

In the case in which an electrode having several material layers formed on a current collector is manufactured according to the conventional art, first slurry is applied to the current collector and is then dried, and second slurry is applied to the dried first slurry and is then dried. In this method, however, drying and transferring processes must be performed whenever each layer is formed, whereby the cost of manufacturing the electrode is excessively increased.

Furthermore, after the first slurry is dried, the mobility of a first binder dispersed or dissolved in a solvent is greatly reduced, with the result that mixing or interaction between the first binder included in the first slurry and a second binder included in the second slurry is greatly reduced. Consequently, it is difficult to secure sufficient binding force between a first mixture layer generated by drying the first slurry and a second mixture layer generated by drying the second slurry.

In contrast, in the manufacturing method according to the present invention, additional drying and transferring processes are not performed after the first slurry is applied to the current collector. That is, the drying process is formed only after the second slurry has been applied. Consequently, it is possible to greatly reduce the cost of manufacturing the electrode.

In addition, the first binder has sufficient mobility before the first slurry is dried. Consequently, the first binder and the second binder may be partially mixed with each other or may sufficiently interact with each other at the interface between the first slurry and the second slurry, with the result that the binding force between the first mixture layer and the second mixture layer is considerably increased after drying.

The binders serve to prevent the separation of the polymer material, the conductive particles, the electrode active material, and the conductive agent, which may be included in the mixture layers, and to secure the binding force between the mixture layers and the current collector. Consequently, it is possible to appropriately select the binders based on the materials included in the mixture layers and the kind of the current collector. The first binder and the second binder may have different compositions.

Meanwhile, the first binder and the second binder may have the same composition. In this case, the first binder and the second binder may be more easily mixed with each other and may more actively interact with each other, with the result that the binding force between the first mixture layer and the second mixture layer is further increased.

As previously described, the PTC material exhibits uniform conductivity at a general operating temperature of the battery. When the temperature in the battery is increased, however, the resistance of the PTC material is abruptly increased, thereby interrupting the flow of current.

The principle by which the PTC material interrupts the flow of current will be described in detail. In the case in which conductive particles are mixed in a polymer material exhibiting low electrical conductivity, a low-resistance electrical path is formed in the polymer material along the conductive particles. In a normal state, therefore, the polymer material exhibits uniform conductivity due to the electrical path defined by the conductive particles. When the temperature of the polymer material is increased, however, the volume of the polymer material is increased, and, according to circumstances, the conductive particles move. Consequently, the distance between the conductive particles is increased, with the result that the resistance of the PTC material is abruptly increased, thereby interrupting the flow of current.

The polymer material is not particularly restricted as long as the polymer material exhibits low electrical conductivity and as long as, when the temperature of the polymer material is increased, the volume of the polymer material is increased to break the electrical path or to block pores, through which ions in the electrode move. For example, thermoplastic polymer may be used as the polymer material.

The thermoplastic polymer may be a semi-crystalline material. The reason for this is that it is possible to more easily acquire PTC properties from the semi-crystalline material than from an amorphous thermoplastic material. The semi-crystalline thermoplastic material may have a crystallinity of 5% or more, specifically, 10% or more, and more specifically 15% or more.

The thermoplastic polymer is not particularly restricted as long as the thermoplastic polymer exhibits the above properties. For example, the thermoplastic polymer may be one or more selected from the group consisting of high density polyethylene, linear low density polyethylene, low density polyethylene, medium density polyethylene, maleic anhydride functionalized polyethylene, maleic anhydride functionalized elastomer, ethylene copolymer (e.g. EXXELOR VA1801 or VA1803 manufactured by ExxonMobil), ethylene butene copolymer, ethylene octene copolymer, ethylene methyl acrylate, ethylene ethyl acrylate, and ethylene acrylate copolymer such as ethylene butyl acrylate copolymer, polyethylene (PE) including glycidyl methacrylate modified polyethylene, polypropylene (PP), maleic anhydride functionalized polypropylene, glycidyl methacrylate modified polypropylene, polyvinyl chloride (PVC), polyvinyl acetate, polyvinyl acetyl, acrylic resin, syndiotactic polystyrene (sPS), poly-tetra-fluoroethylene (PTFE), including, but not limited to, PA6, PA66, PA11, PA12, PA6T, or PAST, polybutylene terephthalate (PBT), polyphenylene sulfide (PPS), polyamide-imide, polyimide, polyethylene vinyl acetate (EVA), glycidyl methacrylate modified polyethylene vinyl acetate, polyvinyl alcohol, polymethyl methacrylate (PMMA), polyisobutylene, polyvinyl chloride, polyvinylidene fluoride (PVDF), polymethyl methacrylate, polyacrylonitrile, polybutadiene, polyethylene terephthalate (PET), poly-8-aminocaprylic acid, polyvinyl alcohol (PVA), and polycaprolactone.

The above specification is merely illustrative, and it is a matter of course that it is possible to manufacture the PTC material using thermosetting polymer in addition to the thermoplastic polymer.

The polymer material may have a content of 1 to 60 weight %, specifically 5 to 50 weight %, based on the total weight of the first mixture.

If the content of the polymer material is less than 1 weight %, the volume of the PTC material is not greatly increased when the temperature of the PTC material is increased, whereby it is difficult to effectively interrupt the flow of current.

On the other hand, if the content of the polymer material is greater than 60 weight %, the polymer material is not distributed as particles but is a coherent mass, with the result that PTC properties are reduced.

The effective operating temperature of the PTC material generated after the first slurry is dried may be appropriately selected within a range within which the battery is generally used without hindrance and within which the safety of the battery against a thermal runaway phenomenon is guaranteed. For example, the PTC material may have an effective operating temperature of 80 to 140° C.

In a concrete example, the binder may have a content of 1 to 60 weight %, specifically 2 to 50 weight %, based on the total weight of the first mixture.

If the content of the binder is less than 1 weight %, the binding force between the first mixture layer, which is a PTC material layer, and the current collector or between the first mixture layer and the second mixture layer, which is an active material layer, is not sufficient, with the result that the binding between the first mixture layer and the current collector or between the first mixture layer and the second mixture layer may be partially released. On the other hand, if the content of the binder is greater than 60 weight %, the resistance of the electrode is increased, which increases the internal resistance of the battery, with the result that the overall performance of the battery is reduced.

The binder is not particularly restricted as long as the binder provides sufficient binding force without inducing chemical change in a battery to which the binder is applied. For example, the binder may be one or more selected from the group consisting of polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

In a concrete example, the conductive particles may have a content of 1 to 60 weight %, specifically 5 to 50 weight %, based on the total weight of the first mixture.

If the content of the conductive particles is less than 1 weight %, the contents of the polymer material and the binder are relatively increased, with the result that the resistance of the electrode is increased. On the other hand, if the content of the conductive particles is greater than 60 weight %, the content of the binder is relatively decreased, with the result that the binding force of the first mixture layer may be reduced.

The conductive particles are not particularly restricted as long as the conductive particles exhibit high conductivity while the conductive particles do not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive particles.

Meanwhile, at step (a) and step (b), the first slurry may be applied so as to be thinner than the second slurry in consideration of the capacity, etc. of the battery.

In a concrete example, at step (a), the first slurry may be applied to have a thickness of 0.1 to 20 μm, specifically 0.4 to 3 μm.

At this time, at step (b), the second slurry may be applied to have a thickness of 5 to 300 μm, specifically 10 to 200 μm, within a range greater than the thickness of the first slurry.

In a concrete example, at step (b), the second slurry may start to be applied before the application of the first slurry over the one surface of the current collector is completed.

In this case, the first slurry and the second slurry may be applied to the current collector almost simultaneously, whereby the time necessary to complete the application of the first slurry and the second slurry may be shortened.

At step (b), the first slurry may be applied to at least a portion of the current collector, and the second slurry may start to be applied within 0.01 seconds to 5 minutes. If the second slurry starts to be applied before 0.01 seconds, it may be difficult to control the process of applying the second slurry to the first slurry and to appropriately generate the PTC material on the current collector after drying. On the other hand, if the second slurry starts to be applied after 5 minutes, the thickness of a mixed layer of the first slurry and the second slurry is small, with the result that it may be difficult to secure sufficient binding force between the first mixture layer and the second mixture layer after drying.

The slurry may be applied using various methods. For example, the slurry may be applied using gravure coating, in which a coating material filled in a concave plate is transferred in a roll-to-roll fashion, or a die coating, in which a movable coating material is applied while being supplied through a slot at a predetermined speed. Gravure coating has an advantage in that the coating material can be thinly applied to the surface, and die coating has an advantage in that the coating material can be uniformly applied even if the coating material is thickly applied.

At step (a), therefore, the first slurry may be applied using gravure coating or die coating.

In the case in which the first slurry is applied using gravure coating, the first slurry, which does not include an active material and thus does not contribute to the security in capacity of the battery, can be thinly coated, whereby it is possible to reduce the thickness of the electrode. In addition, it is possible to prevent the first mixture layer, formed by drying the first slurry, from being excessively thinly formed, whereby it is possible to obtain PTC properties necessary to secure the safety of the battery and to secure binding force between the first mixture layer and the current collector and between the first mixture layer and the second mixture layer.

In the case in which die coating is used, it is possible to apply the first slurry to a thickness of about 1 μm, although it is not possible to apply the first slurry to a smaller thickness than when using gravure coating.

Meanwhile, the second slurry must be applied to have a predetermined thickness or more in order to obtain required capacity of the battery. Consequently, the second slurry may be applied using die coating, in which the second slurry is applied to a larger thickness than when using gravure coating. However, this does not mean that methods other than die coating are not used. The second slurry may be applied using gravure coating.

Most preferably, the first slurry may be applied using gravure coating, and the second slurry may be applied using die coating. In this case, it is possible to manufacture an electrode, the thickness of which is small and which enables the capacity of the battery to be increased and the safety of the battery to be improved.

In accordance with another aspect of the present invention, there is provided a secondary battery electrode manufactured through the above manufacturing method.

In a concrete example, the secondary battery electrode may include a planar current collector, a first mixture layer and a second mixture layer formed on the current collector, the first mixture layer containing a PTC material, the second mixture layer containing an electrode active material, and a mixed layer located between the first mixture layer and the second mixture layer, the first mixture layer and the second mixture layer being mixed with each other in the mixed layer.

The mixed layer may be generated by mixing and drying the first slurry and the second slurry. The mixed layer may further increase the binding force between the first mixture layer and the second mixture layer.

In accordance with another aspect of the present invention, there is provided an electrode assembly including the above electrode and a separator.

The term "electrode" is a common name for a positive electrode or a negative electrode. Hereinafter, other components constituting the electrode and the electrode assembly according to the present invention will be described.

The positive electrode may be manufactured, for example, by applying a positive electrode mixture including a positive electrode active material, a conductive agent, and a binder to a positive electrode current collector. A filler may be further added to the positive electrode mixture as needed.

In general, the positive electrode current collector has a thickness of 3 to 300 μm. The positive electrode current collector is not particularly restricted as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, or titanium. Alternatively, the positive electrode current collector may be made of aluminum or stainless steel, the surface of which is treated with carbon, nickel, titanium, or silver. Specifically, the positive electrode current collector may be made of aluminum. The positive electrode current collector may have a micro-scale uneven pattern formed on the surface thereof so as to increase the binding force of the positive electrode active material. The positive electrode current collector may be configured in various forms, such as a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the positive electrode mixture including the positive electrode active material. The conductive agent is not particularly restricted as long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; or polyphenylene derivatives may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit on the filler as long as the filler does not cause chemical changes in a battery to which the filler is applied, and is made of a fibrous material. As examples of the filler, there may be used olefin polymers, such as polyethylene and polypropylene, and fibrous materials, such as glass fiber and carbon fiber.

On the other hand, the negative electrode is prepared by applying a negative electrode mixture of a negative electrode active material, a conductive agent, and a binder to a negative electrode current collector. A filler may be selectively added to the negative electrode mixture.

The negative electrode current collector is not particularly restricted as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In the same manner as in the positive electrode current collector, the negative electrode current collector may have a micro-scale uneven pattern formed on the surface thereof so as to increase the binding force of the negative electrode active material. The negative electrode current collector may be configured in various forms, such as a film, a sheet, a foil, a net, a porous body, a foam body, and a non-woven fabric body.

In the present invention, negative electrode current collectors may have the same thickness within a range of 3 to 300 μm. According to circumstances, however, the negative electrode current collectors may have different thicknesses.

As the negative electrode active material, for example, there may be used carbon, such as a non-graphitizing carbon or a graphite-based carbon; a metal composite oxide, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \le x \le 1$; $1 \le y \le 3$; $1 \le z \le 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is disposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 30 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as polymer, is used as an electrolyte, the solid electrolyte may function as the separator.

In accordance with another aspect of the present invention, there is provided a secondary battery having the electrode assembly received in a battery case together with an electrolytic solution. The secondary battery may be configured to have a structure in which a stacked/folded type electrode assembly is mounted in a pouch-shaped battery case made of an aluminum laminate sheet while the electrode assembly is impregnated with a non-aqueous electrolyte containing lithium salt.

The non-aqueous electrolyte containing lithium salt is composed of a non-aqueous electrolyte and lithium salt. A non-aqueous organic solvent, an organic solid electrolyte, or an inorganic solid electrolyte may be used as the non-aqueous electrolyte. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}C_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. According to circumstances, in order to impart incombustibility, the non-aqueous electrolyte may further include halogen-containing solvents, such as carbon tetrachloride and ethylene trifluoride. Furthermore, in order to improve high-temperature retention characteristics, the non-aqueous electrolyte may further include carbon dioxide gas. In addition, fluoro-ethylene carbonate (FEC) and propene sultone (PRS) may be further included.

In a concrete example, lithium salt, such as $LiPF_6$, $LiClO_4$, $LiBF_4$, or $LiN(SO_2CF_3)_2$, may be added to a mixed solvent of cyclic carbonate, such as EC or PC, which is a high dielectric solvent, and linear carbonate, such as DEC, DMC, or EMC, which is a low viscosity solvent, to prepare a non-aqueous electrolyte containing lithium salt.

In accordance with other aspects of the present invention, there are provided a battery pack including the secondary battery as a unit cell and a device including the battery pack as a power source.

For example, the device may be a mobile phone, a portable computer, a smartphone, a smart pad, a tablet PC, a netbook computer, a wearable electronic device, an electric vehicle, a hybrid electric vehicle, a plug-in hybrid electric vehicle, or a power storage apparatus. However, the present invention is not limited thereto.

The structures of a lithium secondary battery and a battery pack including the lithium secondary battery as a unit cell and the method of manufacturing a device including the battery pack as a power source are well known in the art to which the present invention pertains, and a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a schematic view showing a secondary battery electrode containing a positive temperature coefficient (PTC) material according to an embodiment of the present invention.

BEST MODE

Now, exemplary embodiments of the present invention will be described in detail with reference to the accompanying drawings. It should be noted, however, that the scope of the present invention is not limited by the illustrated embodiments.

FIG. 1 is a schematic view showing a secondary battery electrode containing a positive temperature coefficient (PTC) material according to an embodiment of the present invention.

Referring to FIG. 1, an electrode 100 includes a current collector 110, a first mixture layer 120, and a second mixture layer 130.

Specifically, the first mixture layer 120, which contains a PTC material, is formed at the upper surface of the current collector 110, and the second mixture layer 130, which contains an electrode active material, is formed at the upper surface of the first mixture layer 120. The electrode active material, which is contained in the second mixture layer 130, may be a positive electrode active material or a negative electrode active material. The current collector 110 may be appropriately selected based on the electrode active material.

In FIG. 1, the interface between the first mixture layer 120 and the second mixture layer 130 is shown in the form of a plane. However, the FIGURE shows the structure of the electrode 100 schematically. In actuality, second slurry is applied to first slurry, which is in a non-dried state. As a result, a region in which the first slurry and the second slurry are mixed with each other may be present at the interface between the first mixture layer and the second mixture layer. For this reason, the interface between the first mixture layer and the second mixture layer may not be clearly defined. In addition, since a region in which the first slurry and the second slurry are partially mixed with each other is present, the binding force between the first mixture layer 120 and the second mixture layer 130 after the slurries are dried is higher than in an electrode manufactured through a conventional electrode manufacturing method.

The thickness of the first mixture layer 120, which contains the PCT material and which is applied to the current collector 110, is less than that of the second mixture layer 130, which contains the electrode active material, in order to secure the capacity of a battery while securing the safety of the battery owing to the presence of the PCT material contained in the first mixture layer 120.

Meanwhile, electrons smoothly move between the electrode active material contained in the second mixture layer 130 and the current collector 110 at the general operating temperature of the battery. The reason for this is that the PTC material contained in the first mixture layer 120 has uniform conductivity at the operating temperature of the battery.

In the case in which the temperature of the battery is increased, however, the resistance of the PTC material contained in the first mixture layer 120 is abruptly increased. Consequently, the electrons cannot move between the second mixture layer 130 and the current collector 110 via the first mixture layer 120, whereby the flow of current is interrupted. As a result, it is possible to prevent the occurrence of a thermal runaway phenomenon in the battery.

In order to prevent the occurrence of such a thermal runaway phenomenon in the battery, the effective operating temperature of the PTC material contained in the first mixture layer 120 may range from 80° C. to 150° C.

Meanwhile, the electrode 100 shown in FIG. 1 is a single-sided electrode, in which the first mixture layer 120 and the second mixture layer 130 are formed only at the upper surface of the current collector 110. In the manufacturing method according to the present invention, however, a mixture layer containing a PTC material and a mixture layer containing an electrode active material may be sequentially formed at the lower surface of the current collector 110, in the same manner as at the upper surface of the current collector 110, in order to manufacture a double-sided electrode, the upper surface and the lower surface of which are symmetrical with respect to the current collector 110.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a method of manufacturing a secondary battery electrode according to the present invention includes a step of applying second slurry to first slurry, which is in a non-dried state, whereby it is possible to reasonably reduce the cost of manufacturing an electrode containing a PTC material and to secure binding force between a PTC material layer and an electrode active material layer.

The invention claimed is:

1. A method of manufacturing a secondary battery electrode containing a positive temperature coefficient (PTC) material, the method comprising:
    (a) applying a first slurry comprising a first mixture and a solvent mixed with each other to one surface of a planar current collector to generate a PTC material after drying, wherein the first mixture comprises a polymer material, conductive particles, and a first binder;
    (b) applying a second slurry comprising a second mixture, comprising an electrode active material, and a solvent mixed with each other to the first slurry, which is in a non-dried state such that a mixed layer is formed, wherein the second mixture comprises an electrode active material, a conducting agent, and a second binder; and
    (c) drying the first slurry and the second slurry applied to the current collector, wherein the first slurry is applied to have a thickness of 0.1 µm to less than 20 µm, and the second slurry is applied to have a thickness of 5 µm to 300 µm, wherein the thickness of the second slurry is larger than the thickness of the first slurry.

2. The method according to claim 1, wherein the first binder and the second binder have different compositions.

3. The method according to claim 1, wherein the first binder and the second binder have a same composition.

4. The method according to claim 1, wherein the polymer material has a content of 1 to 60 weight % based on a total weight of the first mixture.

5. The method according to claim 1, wherein the conductive particles have a content of 1 to 60 weight % based on a total weight of the first mixture.

6. The method according to claim 1, wherein the binder has a content of 1 to 60 weight % based on a total weight of the first mixture.

7. The method according to claim 1, wherein, at step (a), the first slurry is applied using gravure coating or die coating.

8. The method according to claim 1, wherein, at step (b), the second slurry is applied using die coating.

9. The method according to claim 1, wherein, at step (b), the second slurry starts to be applied before completion of application of the first slurry over the one surface of the current collector.

10. The method according to claim 1, wherein, at step (b), the first slurry is applied to at least a portion of the current collector, and the second slurry starts to be applied within 0.01 seconds to 5 minutes thereafter.

11. A secondary battery electrode manufactured by the method according to claim 1.

12. The secondary battery electrode according to claim 11, wherein the secondary battery electrode comprises:
   a planar current collector;
   a first mixture layer and a second mixture layer formed on the current collector, the first mixture layer containing a PTC material, the second mixture layer containing an electrode active material; and
   a mixed layer located between the first mixture layer and the second mixture layer, the first mixture layer and the second mixture layer being mixed with each other in the mixed layer.

13. An electrode assembly comprising the secondary battery electrode according to claim 11.

14. A secondary battery having the electrode assembly according to claim 13 received in a battery case together with an electrolytic solution.

15. A battery pack comprising the secondary battery according to claim 14 as a unit cell.

16. A device comprising the battery pack according to claim 15 as a power source.

17. The device according to claim 16, wherein the device is selected from a group consisting of a mobile phone, a portable computer, a smartphone, a smart pad, a tablet PC, a netbook computer, a wearable electronic device, an electric vehicle, a hybrid electric vehicle, a plug-in hybrid electric vehicle, and a power storage apparatus.

18. A method of manufacturing a secondary battery electrode containing a positive temperature coefficient (PTC) material, the method comprising:
   (a) applying a first slurry comprising a first mixture and a solvent mixed with each other to one surface of a planar current collector to generate a PTC material after drying, wherein the first mixture comprises a polymer material, conductive particles, and a first binder;
   (b) applying a second slurry comprising a second mixture, comprising an electrode active material, and a solvent mixed with each other to the first slurry, which is in a non-dried state such that a mixed layer is formed, and the second mixture comprises an electrode active material, a conducting agent, and a second binder; and
   (c) drying the first slurry and the second slurry applied to the current collector, wherein the first slurry is applied to have a thickness of 0.1 µm to less than 20 µm using a gravure coating, and
   the second slurry is applied to have a thickness of 5 µm to 300 µm using a die-coating, wherein the thickness of the second slurry is larger than the thickness of the first slurry.

19. The method of claim 1, wherein the polymer material consists of a semi-crystalline thermoplastic polymer or a thermosetting polymer.

20. The method of claim 18, wherein the polymer material consists of a semi-crystalline thermoplastic polymer or a thermosetting polymer.

* * * * *